(12) United States Patent
Fujii et al.

(10) Patent No.: US 9,793,749 B2
(45) Date of Patent: Oct. 17, 2017

(54) VEHICLE CHARGING APPARATUS

(75) Inventors: Hiroshi Fujii, Chiyoda-ku (JP);
Nozomu Kamioka, Chiyoda-ku (JP)

(73) Assignee: Mitsubishi Electric Corporation,
Tokyo (JP)

( * ) Notice: Subject to any disclaimer, the term of this patent is extended or adjusted under 35 U.S.C. 154(b) by 1923 days.

(21) Appl. No.: 12/956,792

(22) Filed: Nov. 30, 2010

(65) Prior Publication Data

US 2011/0260683 A1    Oct. 27, 2011

(30) Foreign Application Priority Data

Apr. 21, 2010    (JP) ................................. 2010-097863

(51) Int. Cl.
*H02J 7/00*    (2006.01)
*H02J 7/04*    (2006.01)
(Continued)

(52) U.S. Cl.
CPC .............. *H02J 7/045* (2013.01); *B60L 11/12* (2013.01); *H02P 9/14* (2013.01); *H02P 9/305* (2013.01);
(Continued)

(58) Field of Classification Search
USPC ....... 320/109, 162, 134, 104, 132, 116, 137, 320/138, 140, 108, 111, 118, 127, 128,
(Continued)

(56) References Cited

U.S. PATENT DOCUMENTS 6,577,106 B2 *    6/2003    Lazarovich ................... 320/137
8,188,705 B2 *    5/2012    Wakayama ................... 320/104
(Continued)

FOREIGN PATENT DOCUMENTS

DE            43 07 907 A1      5/1994
DE            197 49 548 A1    10/1998
DE    10 2005 039 822 A1      3/2006
(Continued)

OTHER PUBLICATIONS

Communication, dated Apr. 15, 2016, from the German Patent Office in counterpart German application No. 10 2010 050 418.1.

*Primary Examiner* — Alexis Pacheco
(74) *Attorney, Agent, or Firm* — Sughrue Mion, PLLC; Richard C. Turner (57) ABSTRACT

A vehicle charging apparatus includes: an electric generator 3 that is driven by an internal combustion engine 1 and outputs an adjustable alternating-current voltage; a rectifier 4 that converts the outputted alternating-current voltage to a direct-current voltage; an electric storage device 5 that is charged with the converted direct-current voltage; and a voltage sensor 6 that measures an output voltage of the rectifier 4. The vehicle charging apparatus is provided with a control device 7 that controls the electric generator 3 for a charging voltage to be a target charging voltage calculated from the output voltage in order to suppress a charging current to be lower than a charging current upper limit value when the electric storage device 5 is charged. It thus becomes possible to achieve efficiency higher than that of a charging apparatus in the related art while preventing deterioration or damage of the electric storage device.

5 Claims, 6 Drawing Sheets (51) Int. Cl.
    *B60L 11/12* (2006.01)
    *H02P 9/14* (2006.01)
    *H02P 9/30* (2006.01)
    *H02J 7/34* (2006.01)

(52) U.S. Cl.
    CPC ............ *H02J 7/345* (2013.01); *Y02T 10/642* (2013.01); *Y02T 10/7022* (2013.01); *Y02T 10/7077* (2013.01)

(58) Field of Classification Search
    USPC ................................ 320/136, 148, 149, 157
    See application file for complete search history.

(56) References Cited

U.S. PATENT DOCUMENTS

| | | | |
|---|---|---|---|
| 2003/0178970 A1* | 9/2003 | Minamiura et al. | 320/116 |
| 2006/0046895 A1 | 3/2006 | Thacher et al. | |
| 2007/0267997 A1 | 11/2007 | Kanazawa et al. | |
| 2009/0085516 A1* | 4/2009 | Emori et al. | 320/118 |
| 2009/0266631 A1* | 10/2009 | Kikuchi | 180/65.265 |
| 2009/0315403 A1* | 12/2009 | Ichikawa et al. | 307/82 |
| 2010/0079105 A1* | 4/2010 | Iwanaga et al. | 320/109 |
| 2010/0244782 A1* | 9/2010 | Nagayama et al. | 320/162 |
| 2011/0043165 A1* | 2/2011 | Kinser et al. | 320/109 |

FOREIGN PATENT DOCUMENTS

| | | |
|---|---|---|
| JP | 06-197470 A | 7/1994 |
| JP | 11-046456 A | 2/1999 |
| JP | 2000-278807 A | 10/2000 |
| JP | 2005-269825 A | 9/2005 |
| JP | 2007-312469 A | 11/2007 |

\* cited by examiner

VEHICLE CHARGING APPARATUS

BACKGROUND OF THE INVENTION

1. Field of the Invention

The present invention relates to a charging apparatus that is charged using an electric generator driven by an internal combustion engine, and more particularly, to a vehicle charging apparatus suitable for a hybrid automobile.

2. Description of the Related Art

In an automobile in the related art using the internal combustion engine alone as the power source, an electric generator is mounted to charge a battery, and the battery is charged by converting part of a torque generated by the engine to electric power. The electric generator normally outputs an AC (alternate current), which is converted to a DC (direct current) using a rectifier and the DC is supplied to the battery. While there are cases where a charging voltage of the battery, that is, a DC voltage outputted from the rectifier is automatically adjusted to a constant predetermined voltage by a circuit in the electric generator or the rectifier, a technique of making an output current of the rectifier or an output voltage of the electric generator variable by a control device has been proposed.

As a technique of making an output current of a rectifier variable by a control device, there is a power generating unit disclosed (for example, see Japanese Published Patent Application No. H11-46456 (Patent Document 1)). According to the technique disclosed herein, the control device is configured to enable a supply of electric power from a battery to a coil in an electric generator by switching an output current of a rectifier, so that an output current of the rectifier is made variable by controlling a magnetic flux interlinking with the coil by controlling the switching timing of the rectifier.

Also, as a technique of making an output voltage of an electric generator variable, there is an output control device for an AC electric generator disclosed (for example, see Japanese Published Patent Application No. H06-197470 (Patent Document 2)). According to the technique disclosed herein, the control device is configured to be capable of controlling a field current of an electric generator, so that an output voltage of a rectifier is made variable by controlling the field current. In this case, the control device measures a current output voltage of the rectifier and performs feedback control for the field current to coincide with a given target output voltage.

Either technique makes an output voltage of the rectifier variable with the aim of making a torque that the electric generator extracts from the engine variable in achieving better acceleration performance and preventing rotation fluctuation of the engine.

Meanwhile, a hybrid automobile generates electric power from kinetic energy of the engine or the vehicle and performs regeneration to accumulate electric power and power running to add a torque to the drive shaft by driving a motor using the accumulated electric power. In short, in the hybrid automobile, an electric storage device to drive the motor is mounted. As the electric storage device, a secondary battery, such as nickel hydride and lithium-ion batteries, and a capacitor are used chiefly. The capacitor has lower internal resistance than the secondary battery and therefore has an advantage that large electric power can be supplied to the motor in a short time. However, a voltage of the capacitor drops as a charging amount of the capacitor decreases. Also, in a case where output electric power of the electric generator is large and the capacitor is charged with the electric power outputted directly from the rectifier, a large current flows into the capacitor. This may possibly cause deterioration or damage of the capacitor.

As a countermeasure for such an inconvenience, Japanese Published Patent Application No. 2000-278807 (Patent Document 3) discloses a power supply system of a hybrid electric automobile. According to a technique disclosed herein, a charging current to a capacitor is limited by interposing a resistor between an inverter as a rectifier (hereinafter, referred to simply as the inverter) and the capacitor in series or by interposing a resistor or an inductor between an electric generator and the inverter.

Also, Japanese Published Patent Application No. 2005-269825 (Patent Document 4) discloses a hybrid system. According to a technique disclosed herein, a large current is prevented from flowing to a capacitor by connecting a step-up and -down chopper in series between an inverter and the capacitor or by connecting a constant current circuit in parallel. The step-up and -down chopper is a device that generates a command value of a charging current for a voltage of the capacitor when the capacitor is charged and steps down a charging voltage in response to the generated command value of the charging current. The constant current circuit is a circuit that adjusts a charging current to the capacitor to a constant value.

However, when the techniques disclosed in Patent Document 1 and Patent Document 2 to be applied to the battery are applied to a hybrid automobile using the capacitor as the electric storage device, there is a possibility of deteriorating or damaging the capacitor. Because the hybrid automobile is configured to drive the motor using electric power accumulated in the capacitor during the power running, the voltage of the capacitor may possibly drop to the vicinity of 0 V. Accordingly, when the hybrid automobile shifts later from the power running to the regeneration, charging is started while the voltage of the capacitor has dropped to the vicinity of 0 V.

According to the power generating unit disclosed in Patent Document 1, however, when the voltage of the capacitor has dropped to the vicinity of 0 V, electric power used to adjust the magnetic flux interlinking with the coil in the electric generator cannot be supplied from the capacitor to the electric generator. Hence, because the charging current cannot be lowered, the capacitor is charged with the maximum output voltage of the electric generator determined by the rotation number of the electric generator. Accordingly, in a case where charging is started at a specific rotation number or higher, there is a problem that a large current flows into the capacitor and may possibly deteriorate or damage the capacitor.

Also, in the output control device of the AC electric generator disclosed in Patent Document 2, the target charging voltage is set with the aim of preventing rotation fluctuation caused by an abrupt change in a load torque of the engine during electric power generation. However, no upper limit is set to a voltage difference between the target charging voltage and the current voltage of the capacitor. Hence, there is a possibility that the voltage difference is such that generates a current that deteriorates or damages the capacitor. In particular, when the engine is running at a high rotation speed and low load, an output torque of the engine is sufficiently large in comparison with a torque consumed by the electric generator, which raises a problem that there is a possibility of increasing a voltage difference.

Further, Patent Document 3 and Patent Document 4 have a problem that efficiency is lowered by a loss generated at the resistor, the inductor, the step-up and -down chopper, or the constant current circuit interposed to prevent a large current from flowing into the capacitor.

SUMMARY OF THE INVENTION

The invention was devised to solve the problems discussed above and has an object to provide a vehicle charging apparatus capable of charging without deteriorating or damaging an electric storage device and achieving higher efficiency by reducing a loss.

A vehicle charging apparatus according to an aspect of the invention includes an electric generator that is driven by an internal combustion engine and outputs an adjustable alternating-current voltage; a rectifier that converts the outputted alternating-current voltage to a direct-current voltage; an electric storage device that is charged with the converted direct-current voltage; a voltage sensor that measures an output voltage of the rectifier; and a control device that controls the electric generator for a charging voltage to be a target charging voltage calculated from the output voltage in order to suppress a charging current to be lower than a charging current upper limit value when the electric storage device is charged.

According to the vehicle charging apparatus of the invention, when the electric storage device is charged, by setting the target charging voltage to be a charging current lower than the charging current upper limit value and by controlling the field current of the electric generator for the charging voltage to coincide with the target charging voltage, it becomes possible to achieve efficiency higher than that of a charging apparatus in the related art while preventing deterioration or damage of the electric storage device.

The foregoing and other objects, features, aspects and advantages of the present invention will become more apparent from the following detailed description of the present invention when taken in conjunction with the accompanying drawings.

DETAILED DESCRIPTION OF THE INVENTION

First Embodiment

Figure 1:
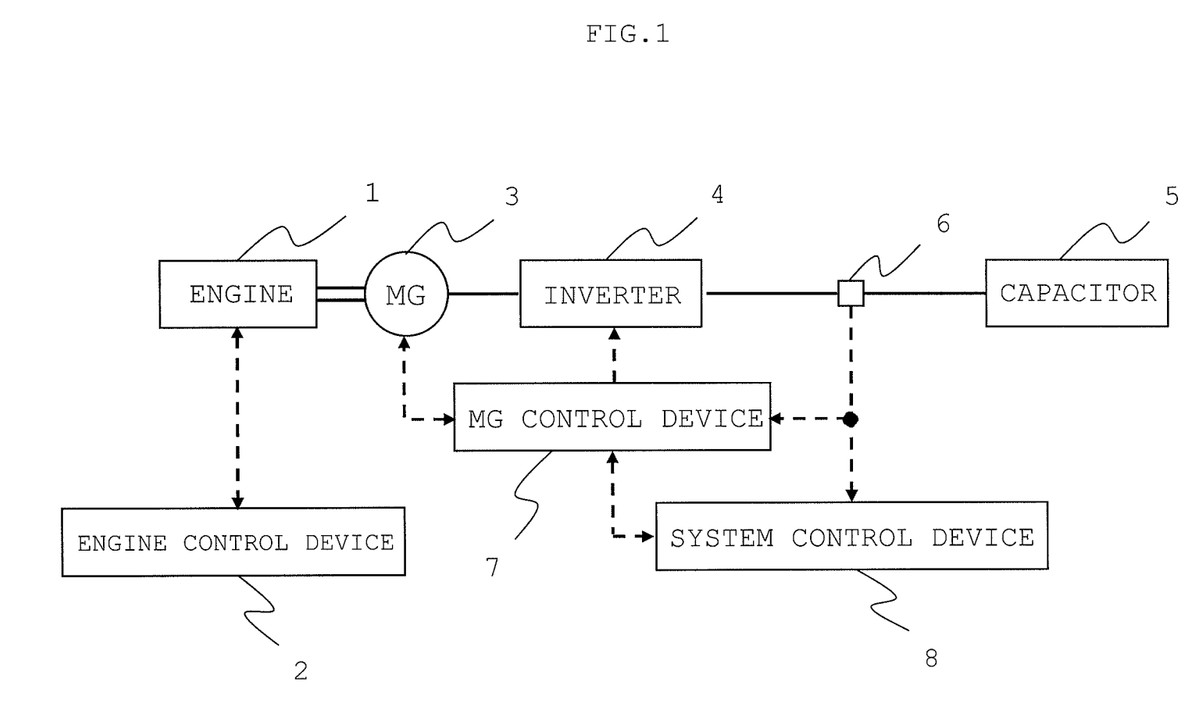
FIG. 1 is a view showing the overall configuration of a vehicle charging apparatus according to a first embodiment of the invention.
Figure 2:
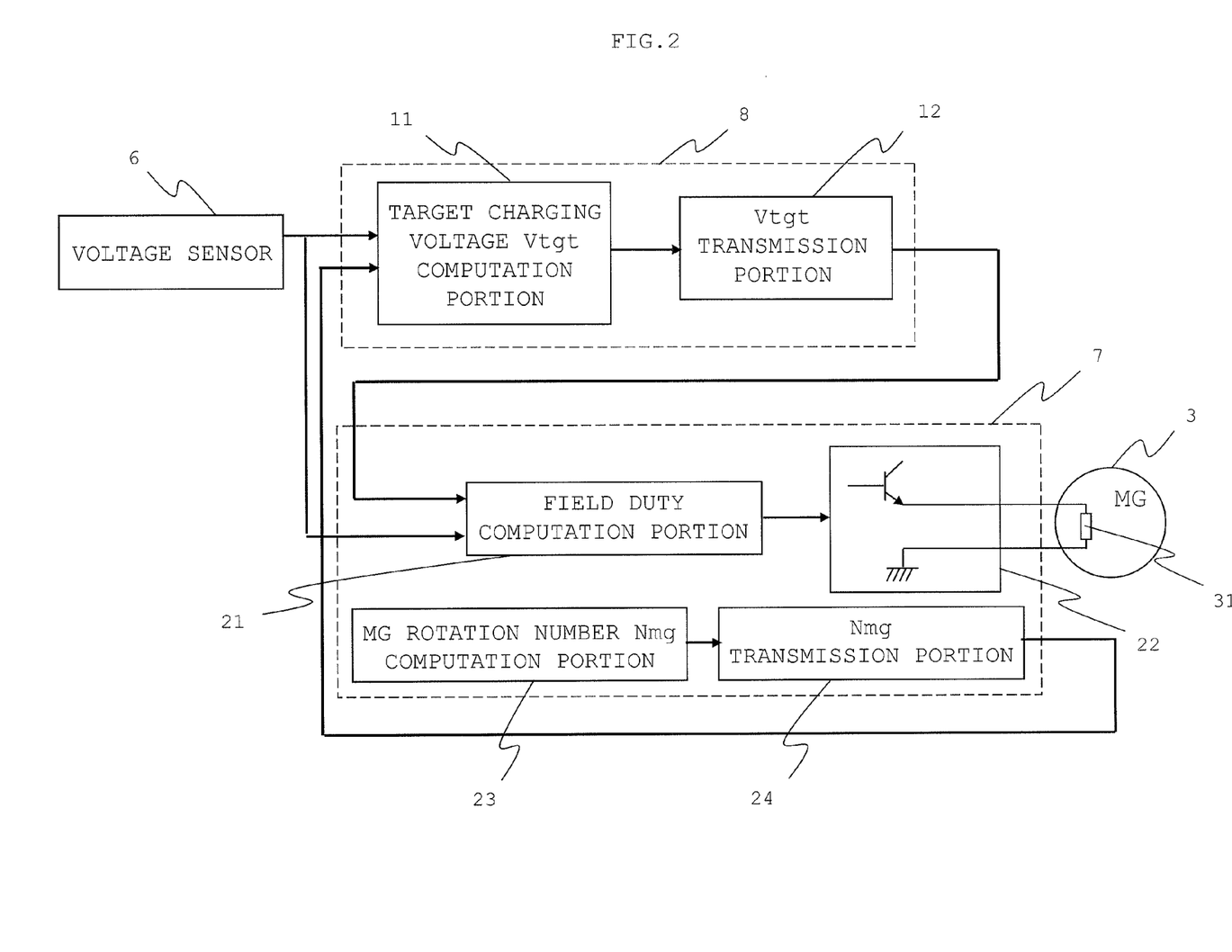
FIG. 2 is a block diagram showing processing by a system control device and an MG control device in the vehicle charging apparatus according to the first embodiment of the invention.
Figure 3:
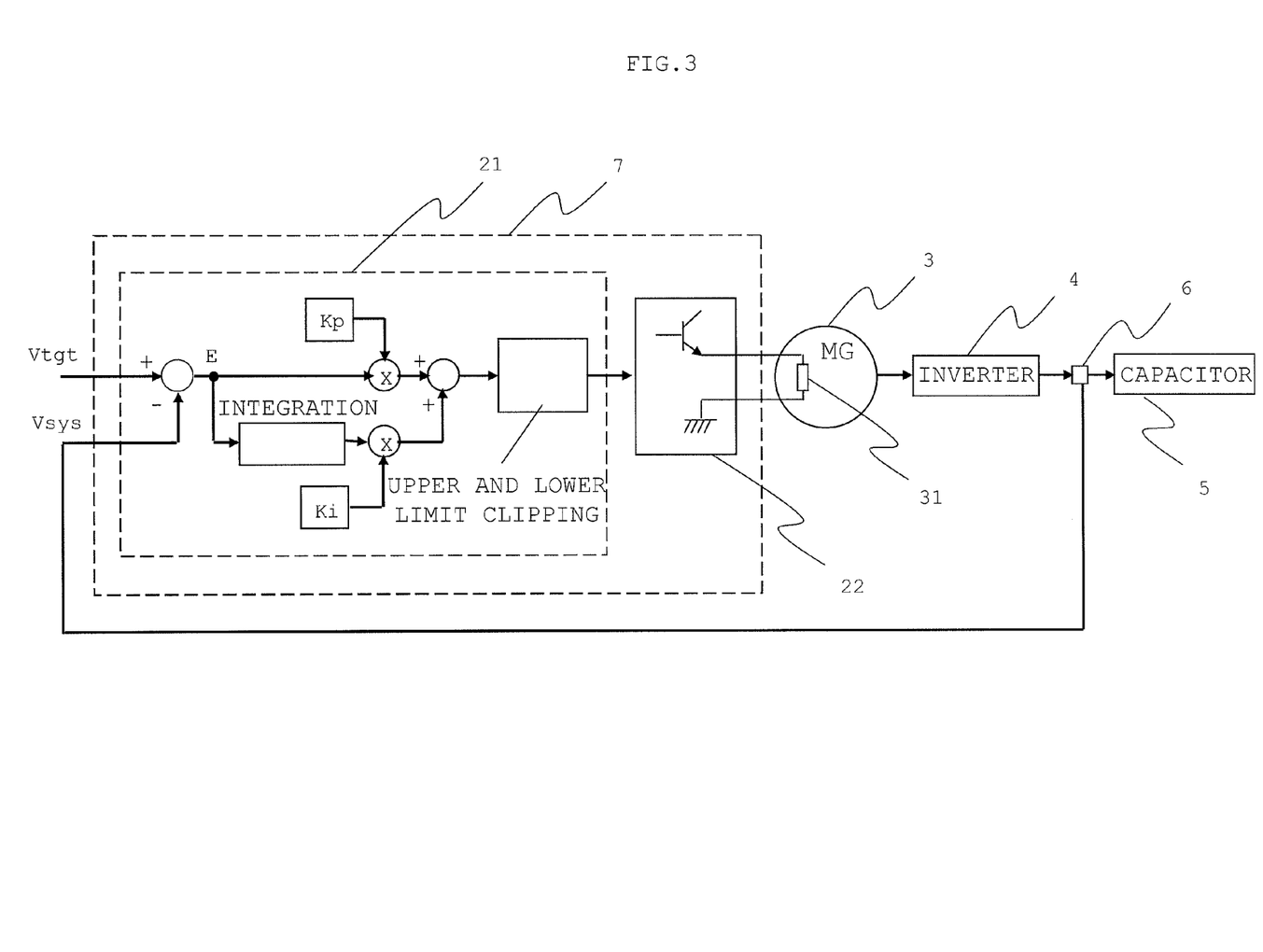
FIG. 3 is a block diagram of a field duty computation portion in the vehicle charging apparatus according to the first embodiment of the invention.

FIG. 1 is a view showing the overall configuration of a vehicle charging apparatus of a first embodiment. FIG. 2 is a block diagram showing processing by a system control device and an MG control device. FIG. 3 is a block diagram of a field duty computation portion.

As is shown in FIG. 1, a vehicle charging apparatus includes an engine 1 that is an internal combustion engine using hydrocarbon fuel, such as gasoline and light gas oil, as a power source, an engine control device 2 that performs control, such as fuel injection control, ignition timing control, and intake air amount regulation control, according to signals inputted therein from various sensors that detect a running condition of the engine 1, a motor generator (hereinafter, abbreviated to MG) 3 that is linked to the output shaft of the engine 1 and can be driven as an electric generator and also driven as an electric motor, an inverter 4 that is connected to the MG 3 and converts electric power to a DC or an AC, a capacitor 5 (for example, electric double layer capacitor) that is an electric storage device that accumulates electric power generated by the MG 3 and converted to a DC in the inverter 4 or supplies the accumulated electric power to the MG 3 after it is converted to an AC in the inverter 4, a voltage sensor 6 that is provided at an output terminal of the inverter 4 and measures a system voltage, an MG control device 7 that is connected to the voltage sensor 6 and controls the MG 3 and the inverter 4, and a system control device 8 that is connected to the voltage sensor 6 and the MG control device 7 and controls the both.

An operation of the vehicle charging apparatus will now be described with reference to the block diagram of FIG. 2 showing the processing by the system control device and the MG control device. The MG control device 7 receives a target charging voltage Vtgt transmitted from a Vtgt transmission portion 12 in the system control device 8 and reads therein a system voltage Vsys from the voltage sensor 6 provided at the output terminal of the inverter 4. Also, a field duty is subjected to feedback computation processing in a field duty computation portion 21 for the target charging voltage Vtgt and the system voltage Vsys to coincide with each other. A field current output circuit 22 is PWM driven by the calculated field duty. Accordingly, a field current corresponding to the calculated field duty is outputted to a field coil 31 in the MG 3 and thereby an output voltage of the MG 3 is controlled. Also, in the MG control device 7, the rotation number of the MG 3, Nmg, is subjected to computation processing in an MG rotation number Nmg computation portion 23 according to a signal from a rotation position detection sensor (not shown) that detects the rotation position of the rotor of the MG 3, and the calculated rotation number Nmg is transmitted to the system control device 8 from an Nmg transmission portion 24. Further, in the system control device 8, the target charging voltage Vtgt is subjected to computation processing in a target charging voltage Vtgt computation portion 11 according to the system voltage Vsys read therein from the voltage sensor 6 and the rotation number of the MG 3, Nmg, received from the MG control device 7. The calculated Vtgt is transmitted from the Vtgt transmission portion 12 to the MG control device 7. By a series of these operations, electric power generated by the MG 3 is converted to a DC in the inverter 4 to charge the capacitor 5.

A specific calculation method of the field duty will now be described with reference to FIG. 3 showing the block diagram of the field duty computation portion 21. A deviation E is set by computation processing of the target charging voltage Vtgt and the system voltage Vsys. Subsequently, PI control computation is performed using the deviation E. A computing equation of PI control is expressed as: $Kp \times E + Ki \times \int E dt$, where Kp is a proportional gain and Ki is an integral gain. These gains are stored in the MG control device 7 as constants. A value found by clipping the computation result of the PI control computation at the upper and lower limits so as to cover a range of 0% to 100% is the field duty. As the field current output circuit 22 is PWM driven by the field duty calculated in this manner, a field current corresponding to the field duty is outputted to the field coil 31 in the MG 3 and electric power corresponding to the field current is outputted from the MG 3. A DC output voltage after electric power generated by the MG 3 is rectified in the inverter 4, that is, the system voltage Vsys is measured by the voltage sensor 6. As Vsys is inputted again into the field duty computation portion 21, the feedback computation of the field duty is repeated.

At the same time, in the MG control device 7, the rotation position of the MG 3 is detected with a signal from the rotation position detection sensor (not shown) by the MG rotation number Nmg computation portion 23. The rotation number of MG 3, Nmg, is subjected to computation processing on the basis of an amount of change in the rotation position for one cycle period T2 (for example, 1.25 ms) of processing cycle. The calculated Nmg is transmitted to the system control device 8 from the Nmg transmission portion 24.

Figure 4:
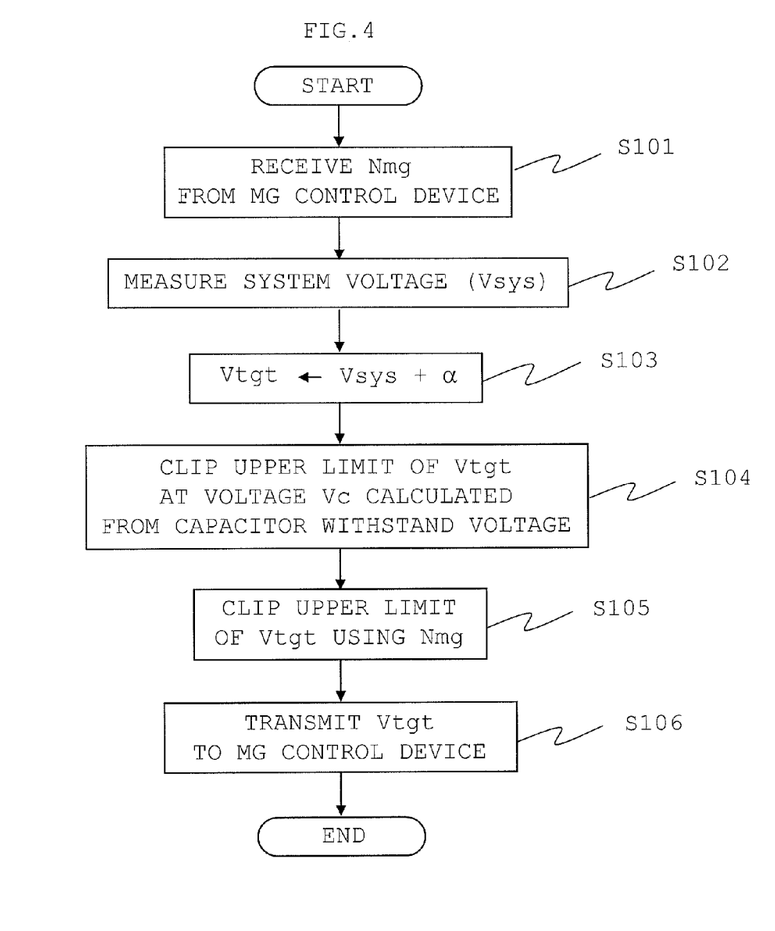
FIG. 4 is a flowchart depicting processing performed by the system control device in the vehicle charging apparatus according to the first embodiment of the invention.

Processing performed by the system control device 8 will now be described with reference to the flowchart of FIG. 4. The processing depicted in FIG. 4 is performed repetitively in a predetermined processing cycle T1 (for example, 10 ms). In Step S101, the rotation number of the MG 3, Nmg, is received from the MG control device 7. In Step S102, Vsys is measured. In Step S103, Vtgt is updated to Vtgt+α. Herein, a value is preliminarily set to α and α is stored in the system control device 8 as a constant. An example of the setting method of α will be described.

Initially, a rated current Imax (for example, 50 A) and an internal resistance value Rc (for example, 1 mΩ) of the capacitor 5 are obtained from the characteristic value of the capacitor 5. A resistance R0 (for example, 29 mΩ) of the wire from the output end of the inverter 4 to the capacitor 5 is calculated from the length and thickness of the wire. In other words, a total resistance value R of the charging circuit of the capacitor 5 is found to be R0+Rc. Incidentally, in the case of charging with the charging voltage Vsys+V0 for the current Vsys, the charging current I(t) is expressed as:

$$I(t)=(V0/R)\times\exp(-t/R/C) \quad (1).$$

The maximum current I0 is expressed as:

$$I0=V0/R \quad (2)$$

Figure 5:
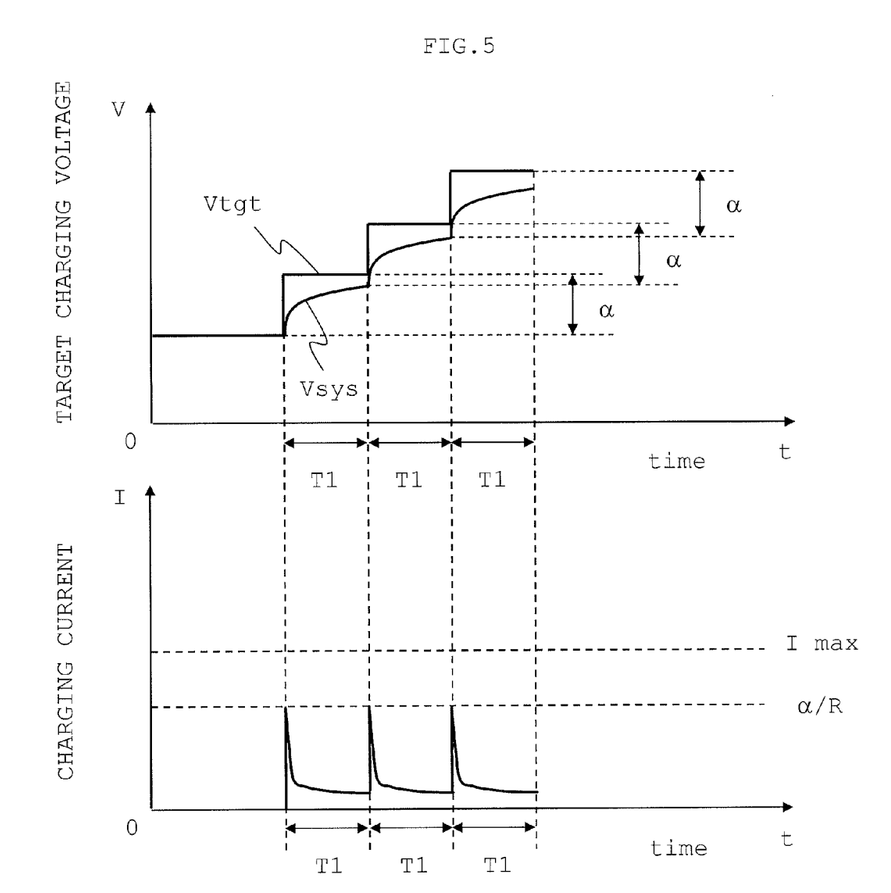
FIG. 5 is a view showing changes with time in a system voltage, a target charging voltage, and a charging current of the vehicle charging apparatus according to the first embodiment of the invention.

Because V0 such that satisfies V0/R=Imax is a potential difference (herein, 1.5 V) that generates the rated current Imax, the voltage value α is set to a value (for example, 1 V) smaller than V0 and stored in the system control device 8 as a constant. With the use of the stored α, Vtgt is set to Vsys+α. The relation of the system voltage and the charging current when Vtgt is set in this manner is set forth in FIG. 5. Because Vtgt is updated to Vsys+α using the measured value of Vsys in every processing cycle T1, the potential difference between Vtgt and Vsys when Vtgt is updated is found to be α. Hence, the maximum current α/R (herein, 33 A) flows as a charging current and the charging current is lower than Imax.

A voltage value Vc, which is found by subtracting a margin (for example, 5 V) from the withstand voltage of the capacitor 5 obtained from the characteristic value of the capacitor 5, is preliminarily calculated and stored in the system control device 8 as a constant. In step S104, the upper limit of Vtgt is clipped at Vc. Further, in Step S105, the upper limit is clipped at or below the maximum charging voltage Vmg determined by Nmg. The value of Vmg for Nmg is found by actually measuring the maximum charging voltage for Nmg when electric power is generated, for example, by the field duty of 90%, and this value is stored in the system control device 8 as a map value. In Step S106, Vtgt is transmitted to the MG control device 7.

Figure 6:
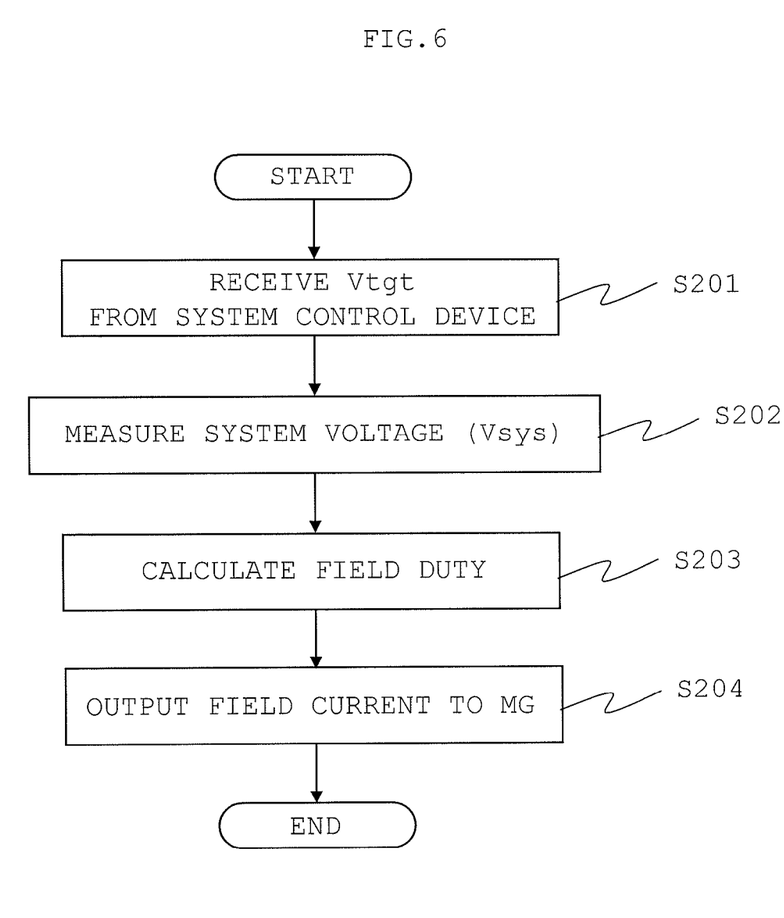
FIG. 6 is a flowchart depicting processing to perform feedback computation of a field duty and to output the field current by the MG control device in the vehicle charging apparatus according to the first embodiment of the invention.

Processing to subject the field duty to feedback computation processing and to calculate the field current in the MG control device 7 will be described using the flowchart of FIG. 6. The processing to control the field current of the MG 3 depicted in FIG. 6 is performed repetitively in a predetermined processing cycle T2 (for example, 1.25 ms). In Step S201, Vtgt is received from the system control device 8. In Step S202, Vsys is read in from the voltage sensor 6. In Step S203, the field duty is subjected to feedback computation processing in accordance with the block diagram of FIG. 3 for Vtgt and Vsys to coincide with each other. In Step S204, the field current output circuit 22 is PWM driven by the field duty calculated in Step S203 and the field current corresponding to the field duty is outputted to the field coil 31 in the MG 3.

As has been described, according to the first embodiment, the target charging voltage Vtgt is set so that a charging current at or above the charging current upper limit value is not generated at all times. Hence, in comparison with cases where the techniques of Patent Document 1 and Patent Document 2 are directly applied to charge the capacitor in a hybrid automobile, there is an advantage of preventing a large current that deteriorates or damages the capacitor from flowing therein at all times. Also, by performing the feedback control on the field current of the electric generator, electric power consumed by the field current can be smaller than electric power consumed by the resistor, the inductor, the step-up and -down chopper, or the constant current circuit in Patent Document 3 and Patent Document 4. Hence, the first embodiment achieves efficiency higher than those in Patent Document 3 and Patent Document 4. In view of the foregoing, the invention can achieve further higher efficiency with a charging apparatus capable of preventing deterioration or damage of the capacitor.

A difference of advantages between the vehicle charging apparatus of the first embodiment and the charging apparatuses of Patent Documents 1 through 4 in the related art will be described using specific examples.

In Patent Document 1, for example, a capacitor having a rated current of 50 A and whose upper limit voltage available well within the withstand voltage of the capacitor is limited to 30V is used. Given that an output of the electric generator is 5 kW, a total resistance value of the capacitor charging circuit including the internal resistance of the capacitor is 30 mΩ, and the current voltage of the capacitor is 0 V. Then, in a case where charging is started when the output voltage of the rectifier is 30 V, the output current cannot be adjusted. Hence, there is a possibility that a current of 167 A, which is the maximum output current of the electric generator, flows into the capacitor.

In Patent Document 2, because no upper limit is set to a voltage difference between the target charging voltage and the current voltage of the capacitor, for example, in a case where a capacitor having a rated current of 50 A and whose upper limit voltage available well within the withstand voltage of the capacitor is limited to 30 V is used, the target charging voltage is set to 30 V even when the current voltage of the capacitor is 0 V. Accordingly, there is a possibility that a voltage difference between the target charging voltage and the current voltage of the capacitor becomes 30 V. In this instance, given that an output of the electric generator is 5 kW, a total resistance value of the capacitor charging circuit is 30 mΩ, and the current voltage of the capacitor is 0 V, then there is a possibility that a current of 167 A, which is the maximum output current of the electric generator, flows into the capacitor.

By contrast, in the first embodiment, because the target charging voltage can be set so that a charging current at or above the charging current upper limit value is not generated, for example, even when the voltage of the capacitor is 0 V, the target charging voltage can be set to 1 V. Hence, given that a total resistance value of the capacitor charging circuit is 30 mΩ, then the charging current is suppressed to 33 A at a maximum, which is lower than the rated current of the capacitor, 50 A. Accordingly, there can be achieved an advantage that a large current causing deterioration or damage of the capacitor can be prevented from flowing into the capacitor at all times.

In Patent Document 3, for example, in a case where a rated current of the capacitor is 50 A and a voltage outputted from the inverter is 50 V at a maximum, the resistor interposed between the inverter and the capacitor has resistance of 1Ω. In this instance, electric power consumed by the resistor is 2.5 kW. Likewise, in a case where the resistor or the inductor is interposed between the electric generator and the inverter, electric power of about 2.5 kW is consumed by the resistor or the inductor.

In Patent Document 4, for example, in a case where a rated current of the capacitor is 50 A, a voltage outputted from the inverter is 50 V at a maximum, and an output of the electric generator is 5 kW, the output current is found to be 100 A. However, because the charging current to the capacitor is limited to 50 A by the step-up and -down chopper or the constant current circuit, up to 50 A is consumed by the step-up and -down chopper or the constant current circuit, that is, a current equivalent to 2.5 kW of electric power is consumed.

By contrast, in the first embodiment, the field current is supplied from a 14-V battery for electrical component and it is about 20 A at a maximum. Hence, electric power consumed by the field current is 0.28 kW at a maximum. Accordingly, electric power consumed by the field current in the charging apparatus of the invention is smaller than electric power consumed by the resistor, the inductor, the step-up and -down chopper, or the constant current circuit in the charging apparatus in the related art. Hence, the invention achieves higher efficiency. In addition, according to the invention, because the target charging voltage can be set so that the charging current of the capacitor is lower than the upper limit value, it becomes possible to prevent a large current deteriorating or damaging the capacitor from flowing into the capacitor at all times.

As has been described, in the vehicle charging apparatus of the first embodiment, the target charging voltage is set to be a charging current lower than the charging current upper limit value, which is the upper limit of the charging current determined for each electric storage device, and the field current of the electric generator is controlled for the charging voltage to coincide with the target charging voltage. Consequently, there can be achieved a significant advantage that the efficiency can be enhanced in comparison with the charging apparatus in the related art while preventing deterioration or damage of the electric storage device.

As other embodiments, it is possible to transmit the system voltage Vsys inputted into the system control device 8 to the MG control device 7 instead of inputting the system voltage Vsys to the MG control device 7. In this case, the MG control device 7 performs the feedback computation of the field current using Vsys and the target charging voltage Vtgt transmitted from the system control device 8. Conversely, it is also possible to transmit the system voltage Vsys inputted into the MG control device 7 to the system control device 8 so that the system control device 8 calculates the target charging voltage Vtgt using the received Vsys.

Regarding the configuration of the vehicle charging apparatus of the first embodiment, a case where the charging apparatus is formed of independent devices has been described. It should be appreciated, however, that a plurality of devices may be integrated. For example, it is also possible to use a control device in which the MG control device 7 and the system control device 8 are integrated, a control device in which the engine control device 2 and the system control device 8 are integrated, and a device in which the MG 3, the inverter 4, and the MG control device 7 are integrated.

Also, regarding the configuration of the vehicle charging apparatus of the first embodiment, a case where a capacitor is used as the electric storage device has been described. It should be appreciated, however, that the same advantages can be expected when other rechargeable secondary batteries, such as a nickel hydride battery and a lithium-ion battery, are used.

Same reference numerals denote same or equivalent portions in the respective drawings.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A vehicle charging apparatus comprising:
    an electric generator that is driven by an internal combustion engine and outputs an adjustable alternating-current voltage;
    a rectifier that converts the outputted alternating-current voltage to a direct-current voltage;
    an electric storage device that is charged with the converted direct-current voltage;
    a voltage sensor that measures an output voltage of the rectifier; and
    a control device that controls the electric generator for a charging voltage to be a target charging voltage calculated from the output voltage in order to suppress a charging current to be lower than a charging current upper limit value when the electric storage device is charged.

2. The vehicle charging apparatus according to claim 1, wherein
    the electric generator is capable of adjusting an output voltage up to a range of an upper limit voltage that the electric generator can output by adjusting a field current.

3. The vehicle charging apparatus according to claim 1, wherein
    the target charging voltage is increased step by step by a predetermined voltage.

4. The vehicle charging apparatus according to claim 1, wherein
    the electric generator is a motor generator that is driven as an electric generator and also driven as an electric motor.

5. The vehicle charging apparatus according to claim 1, wherein
the electric storage device is formed of a capacitor.

* * * * *